US012208641B1

(12) United States Patent
Todd

(10) Patent No.: US 12,208,641 B1
(45) Date of Patent: Jan. 28, 2025

(54) HANDWRITING TOOL AND METHOD OF USE

(71) Applicant: Graeme Victor Todd, Parma, OH (US)

(72) Inventor: Graeme Victor Todd, Parma, OH (US)

( * ) Notice: Subject to any disclaimer, the term of this patent is extended or adjusted under 35 U.S.C. 154(b) by 0 days.

(21) Appl. No.: 18/826,371

(22) Filed: Sep. 6, 2024

(51) Int. Cl.
*B43L 7/02* (2006.01)
*B43L 13/02* (2006.01)

(52) U.S. Cl.
CPC ............... *B43L 7/023* (2013.01); *B43L 13/02* (2013.01)

(58) Field of Classification Search
CPC ................................. B43L 7/023; B43L 13/02
See application file for complete search history.

(56) References Cited

U.S. PATENT DOCUMENTS 2,562,479 A * 7/1951 Spikes ................. G09B 21/002 434/117
3,386,191 A * 6/1968 Michel ................. G09B 21/002 434/117
3,949,492 A * 4/1976 Less ..................... G09B 21/002 434/117
4,539,759 A * 9/1985 Dowzall ................. B44C 1/162 33/447
4,679,328 A * 7/1987 Saad ..................... B43L 13/041 33/447
5,337,484 A * 8/1994 Cardon ................. B43L 13/201 33/41.2
5,823,500 A * 10/1998 La Coste ................ B43L 3/008 248/452
8,763,263 B2 * 7/2014 Dallman ................ G09B 11/00 33/286

FOREIGN PATENT DOCUMENTS

KR 20150066092 A * 6/2015
KR 20160057884 A * 5/2016

* cited by examiner

*Primary Examiner* — Yaritza Guadalupe-McCall

(57) ABSTRACT

A handwriting tool includes a paper holder having a writing surface, a longitudinal axis, an upper section, a lower section, and a plurality of spaced-apart line stations disposed parallel to the longitudinal axis. A writing guide is connected to the paper holder, the writing guide is slidably positionable along the longitudinal axis. The writing guide has a stop which is engagable with each line station of the plurality of spaced-apart line stations. The writing guide includes a transverse upper writing edge which is positionable in the upper section of the paper holder, and a transverse lower writing edge which is positionable in the lower section of the paper holder.

16 Claims, 14 Drawing Sheets

HANDWRITING TOOL AND METHOD OF USE

CROSS REFERENCE TO RELATED APPLICATION

None

TECHNICAL FIELD

The present invention pertains generally to handwriting, and more particularly to a handwriting tool which improves the look and legibility of both printed and cursive handwriting.

BACKGROUND OF THE INVENTION

The handwriting of many people suffers because it is neither legible nor aesthetically pleasing. This presents a problem in that the intent of the writer cannot be properly understood by the reader. Devices are known in the art which are targeted at improving a person's handwriting.

BRIEF SUMMARY OF THE INVENTION

The present invention is directed to a handwriting tool which improves the neatness, consistency, and legibility of written text. A slidable writing guide is positionable on a paper holder, and has two writing edges to guide the writer to consistently hand write in straight, evenly spaced lines on blank paper.

The handheld ergonomic device assists in achieving neat, legible, handwritten script, whether in print or cursive. The tool can also help boost confidence for those who struggle to achieve neat handwriting. The uncluttered look on blank paper is attained by eliminating the need for visible markings, such as lines, dots or grids. The tool is simple to operate and helps to retain the unique writing style that identifies each user. The tool is fabricated from durable materials to ensure unfailing use. The tool can be used to write letters, documents, lists or any other textual format the writer desires.

1 In accordance with an embodiment, a handwriting tool includes a paper holder which has a writing surface, a longitudinal axis, an upper section, a lower section, and a plurality of spaced-apart line stations disposed parallel to the longitudinal axis. A writing guide is connected to the paper holder, the writing guide being slidably positionable along the longitudinal axis. The writing guide has a stop which is engagable with each line station of the plurality of spaced-apart line stations. The writing guide includes a transverse upper writing edge which is positionable in the upper section of the paper holder, and a transverse lower writing edge which is positionable in the lower section of the paper holder.

In accordance with another embodiment, the writing guide is positionable to a plurality of detent positions along the longitudinal axis of the paper holder, wherein each detent position corresponds to a line of text at the upper writing edge and a line of text at the lower writing edge.

In accordance with another embodiment, the writing guide is a sleeve which surrounds the paper holder.

In accordance with another embodiment, the plurality of spaced-apart line stations are evenly spaced holes, and the stop is a pin which is engageable with each of the holes.

In accordance with another embodiment, a window is disposed in the writing guide, the lower writing edge forming a lower edge of the window.

In accordance with another embodiment, a plurality of upper guide lines are disposed adjacent the upper writing edge, and a plurality of lower guide lines are disposed adjacent the lower writing edge.

In accordance with another embodiment, the handwriting tool cooperates with a sheet of paper wherein the paper holder includes a magnetic clip which holds the sheet of paper in place.

In accordance with another embodiment, a total number of the spaced-apart line stations is n and a number of lines of text provided by the handwriting tool is equal to 2n.

Other embodiments, in addition to the embodiments enumerated above, will become apparent from the following detailed description, taken in conjunction with the accompanying drawings, which illustrate, by way of example, the principles of the handwriting tool and method of use.

DETAILED DESCRIPTION OF THE INVENTION

Figure 1:
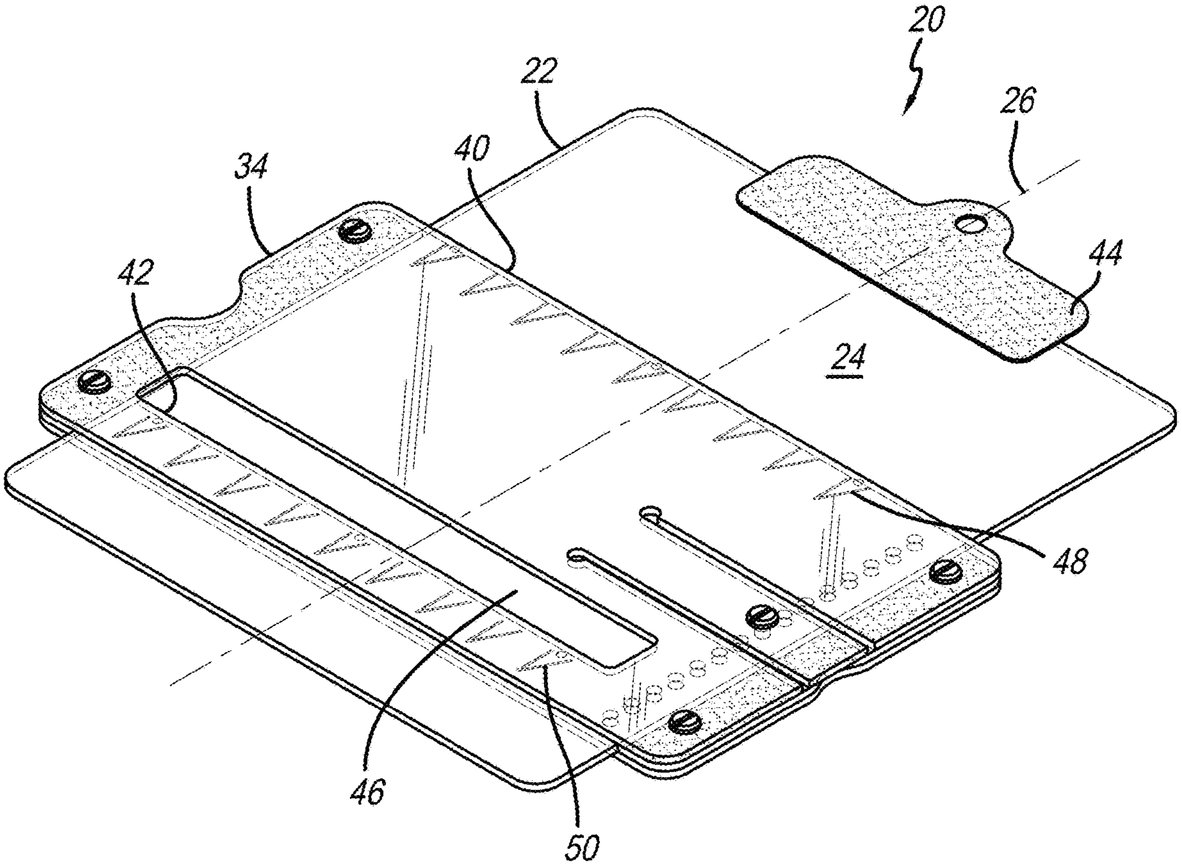
FIG. 1 is a perspective view of a handwriting tool.
Figure 2:
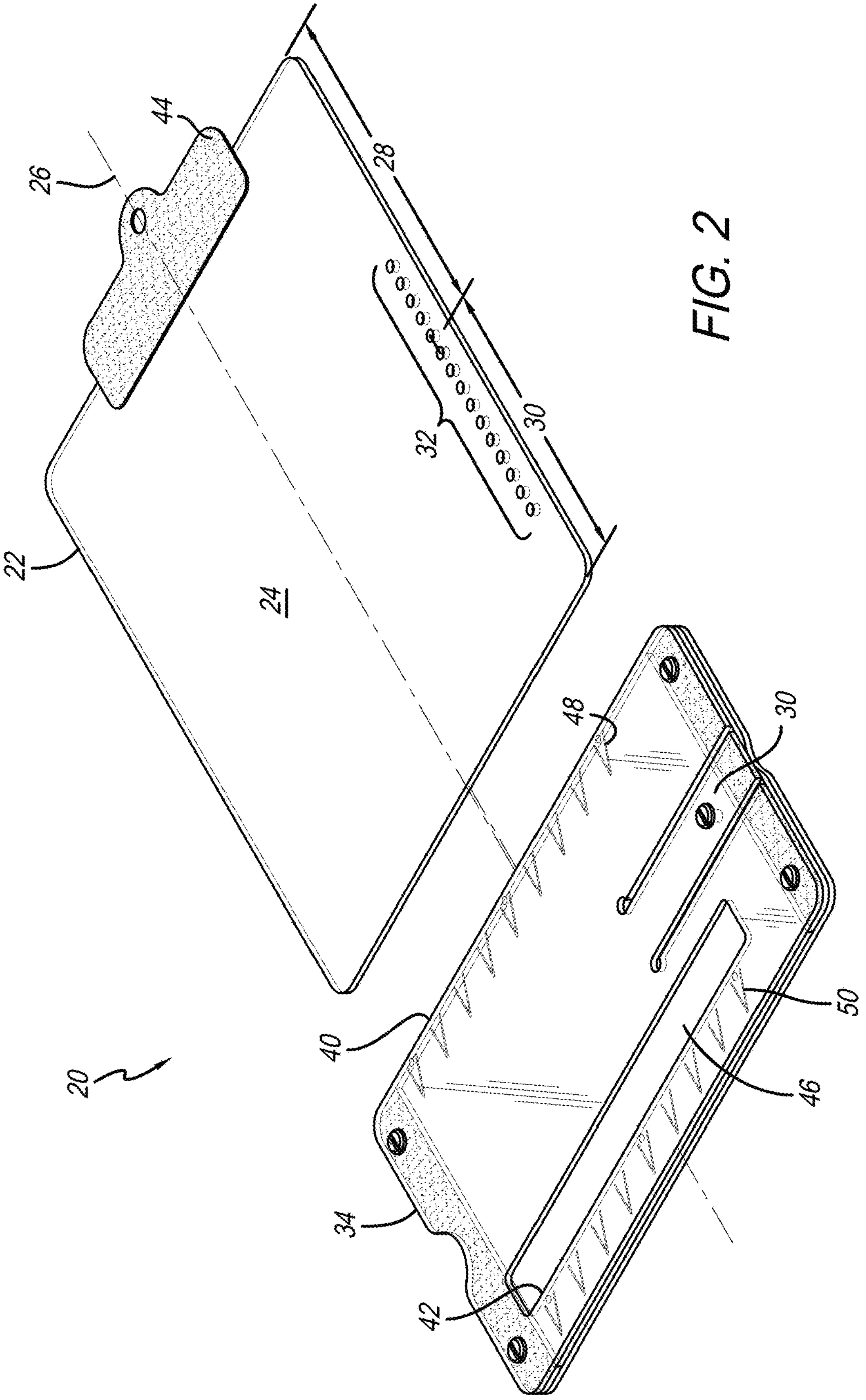
FIG. 2 is an exploded view of the handwriting tool.
Figure 3:
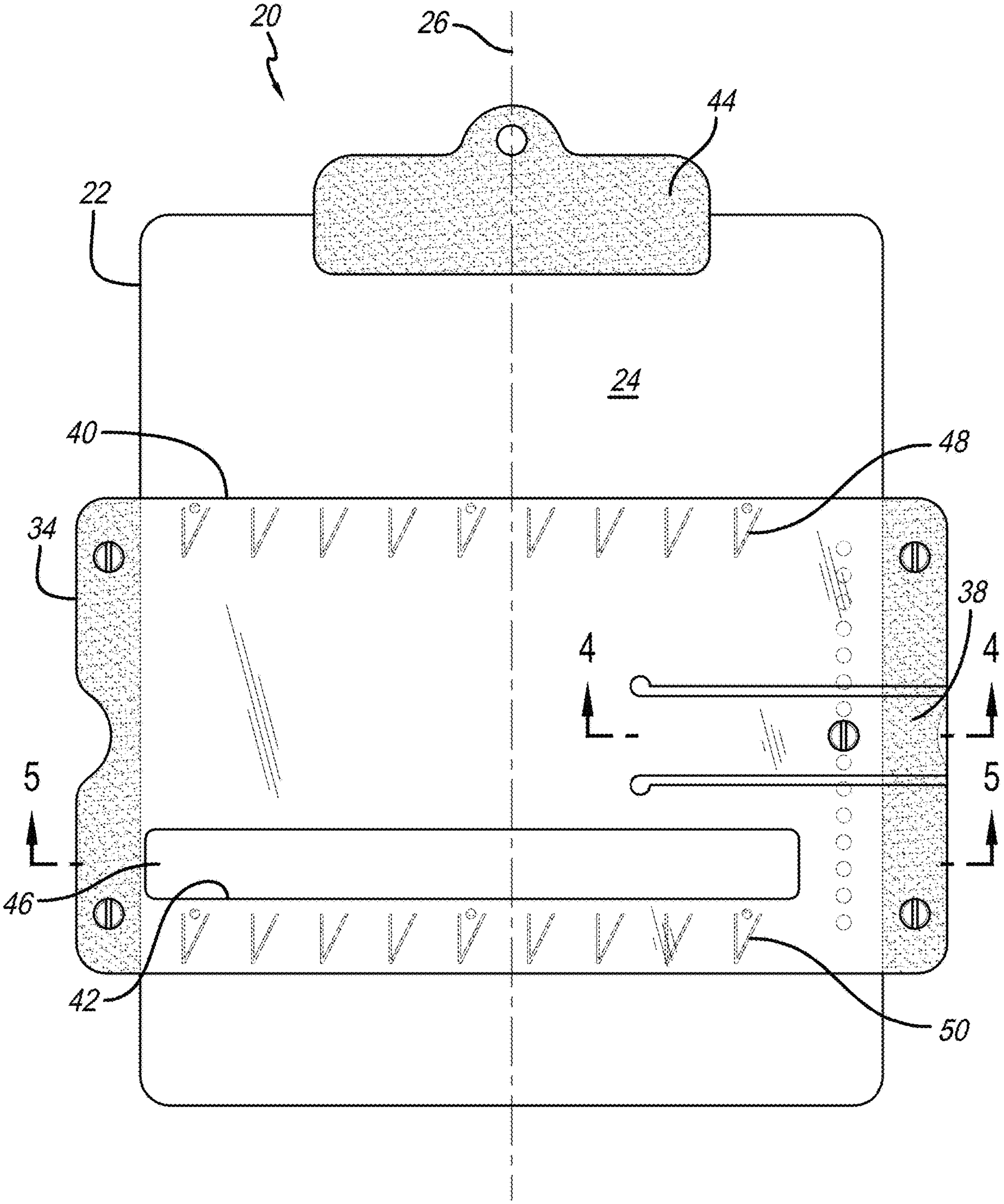
FIG. 3 is a top plan view of the handwriting tool.
Figure 4:
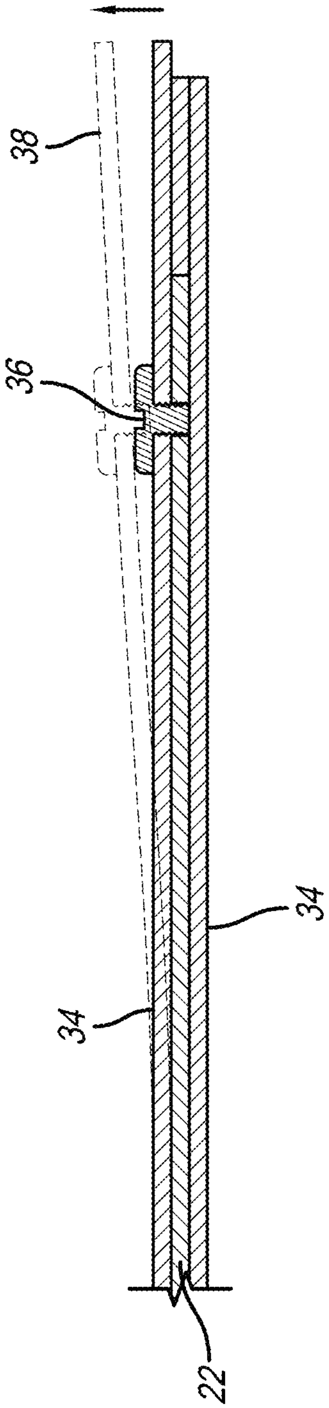
FIG. 4 is a cross sectional view along the line 4-4 of FIG. 3.
Figure 5:
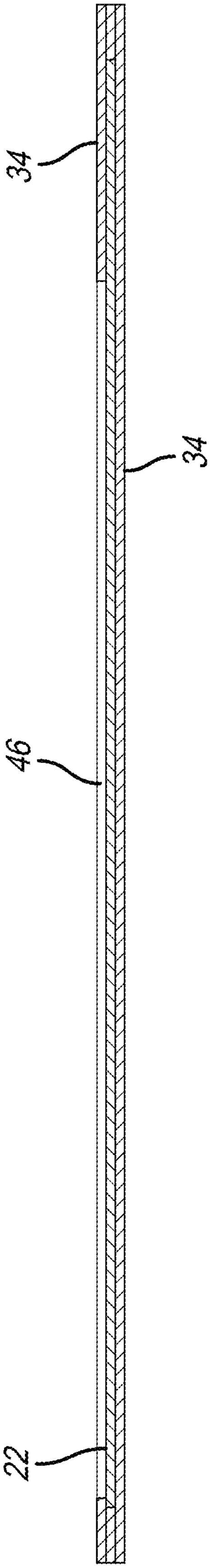
FIG. 5 is a cross sectional view along the line 5-5 of FIG. 3.
Figure 6:
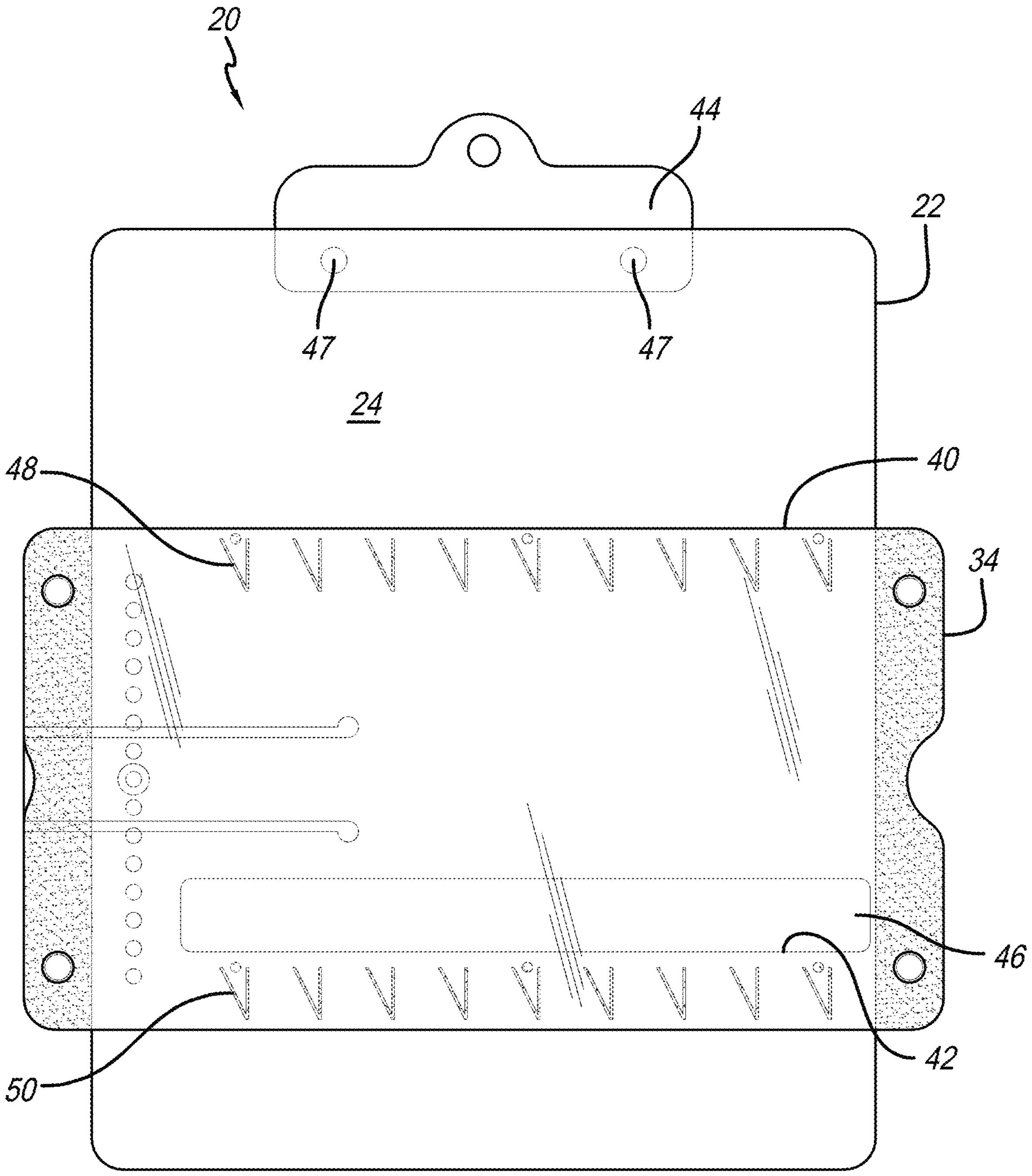
FIG. 6 is a bottom plan view of the handwriting tool.

Referring initially to FIGS. 1-6 there are illustrated several views of a handwriting tool generally designated as 20. Handwriting tool 20 includes a paper holder 22 which has a writing surface 24, a longitudinal axis 26, an upper section 28, a lower section 30, and a plurality of spaced-apart line stations 32 disposed parallel to longitudinal axis 26. In the shown embodiment spaced-apart line stations 32 are evenly spaced holes (15 holes spaced about 5/16$^{th}$ of an inch apart). It may be appreciated however that a lesser or greater number of line stations 32 can be utilized, and that the spacing of the line stations 32 can be closer or further apart. A writing guide 34 is connected to paper holder 22 and is slidably positionable along longitudinal axis 26 of paper holder 22. In the shown embodiment, writing guide 34 is a sleeve which surrounds paper holder 22. Writing guide 34 has a stop 36 which is engagable with each line station 32 of the plurality of spaced-apart line stations. In FIG. 4 stop 36 (a pin in the shown embodiment) is shown engaging one line station 32 (a hole). Stop 36 is raised to disengage it from one line station 32 and move it to another line station 32 (refer to broken lines in FIG. 4). The raising is made possible by a flexible section 38 of writing guide 34 which can be lifted up to disengage stop 36.

Figure 7:
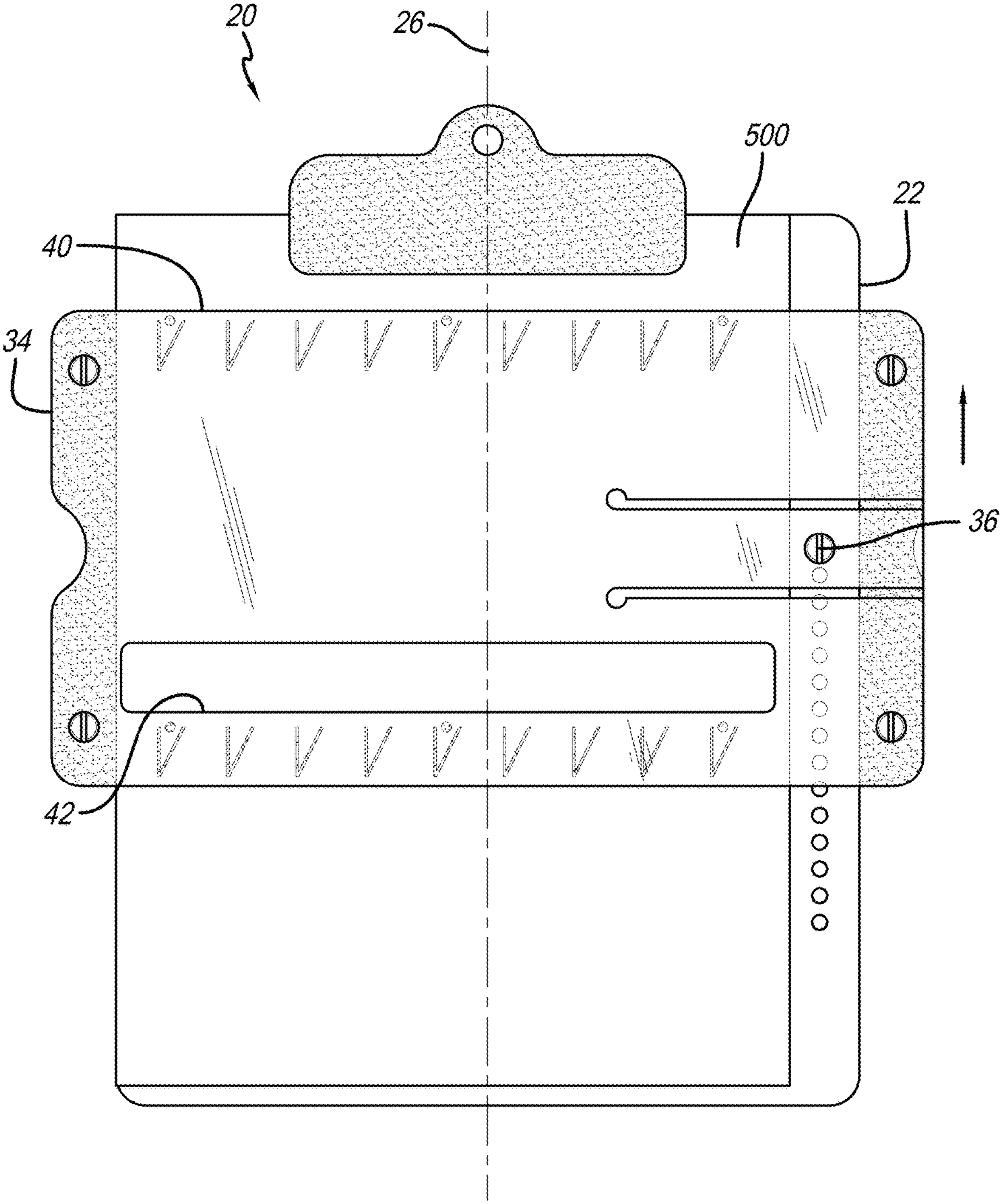
FIG. 7 is a top plan view of the handwriting tool with a sheet of paper installing in the tool.

In the shown embodiment paper holder 22 is a clipboard which has a magnetic clip 44 which engages two embedded magnets 47 (refer to FIG. 6) to hold a sheet of paper 500 in place (refer to FIG. 7). It is also noted that paper holder 22 has an only slightly rounded upper left corner which serves to facilitate registration of the sheet of paper 500 in the paper holder 22.

Writing guide 34 further includes a transverse upper writing edge 40 which is positionable in upper section 28 of paper holder 22, and a transverse lower writing edge 42 which is positionable in lower section 30 of paper holder 22. Both upper writing edge 40 and lower writing edge 42 are oriented perpendicular to longitudinal axis 26. Writing edges 40 and 42 serve to define a lower limit of a line of written text (refer to FIGS. 8-13). A window 46 is disposed in writing guide 34 wherein lower writing edge 42 forms a lower edge of window 46. Writing guide 34 further includes a plurality of upper guide lines 48 disposed adjacent to upper writing edge 40, and a plurality of lower guide lines 50 disposed adjacent lower writing edge 42. The upper 48 and lower 50 guidelines serve as a guide for writing. Cursive writing is typically written at an angle, whereas printing is usually written straight up and down. The guidelines help in providing consistent slanted or straight text. It is noted that herein the term text includes any group of characters including letters, numbers, punctuation, spaces, other symbols. It is also noted that in the shown embodiment both paper holder 22 and writing guide 34 are fabricated from a transparent material (e.g. a clear polymer).

Referring now to FIG. 7, a sheet of paper 500 has been installed in writing tool 20. Sheet of paper 500 is positioned so that its top edge aligns with the top edge of paper holder 22, and its left edge aligns with the left edge of paper holder 22. Writing guide 34 is positionable to a plurality of detent positions (as defined by the plurality of line stations 32) along longitudinal axis 26 of paper holder 22, wherein each detent position corresponds to a line of text at upper writing edge 40 and a line of text at lower writing edge 42. That is, writing guide 34 is initially positioned to the shown uppermost position with stop 36 residing at the uppermost line station 32. After writing one line of text using upper writing edge 40, stop 36 is moved down one line station 32 and another line of text is written (refer to FIGS. 8 and 9). This process continues until lines of text have been written at all guide stations 32. Then writing guide 34 is returned to the top line station 32 and the entire process is repeated using lower writing edge 42. It is noted that in general, if the total number of spaced-apart line stations is n, then the number of lines of text provided by handwriting tool 20 will be equal to 2n. In the shown example n is equal to 15, so the writing tool 20 provides 30 possible lines of text on each page of paper.

Figure 8:
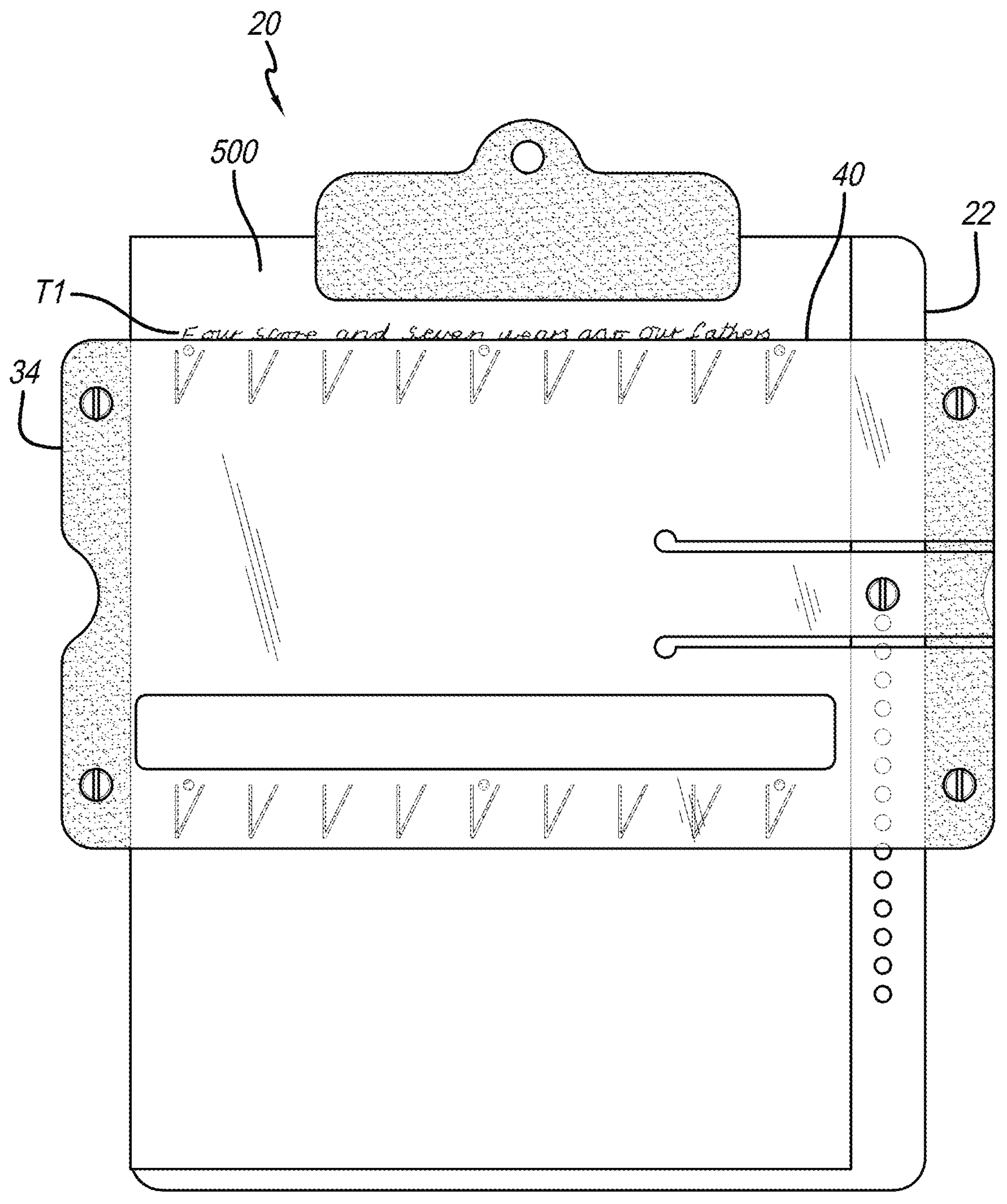
FIG. 8 is a top plan view of the handwriting tool with a first line of text written on the sheet of paper using a transverse first writing edge as a guide.
Figure 9:
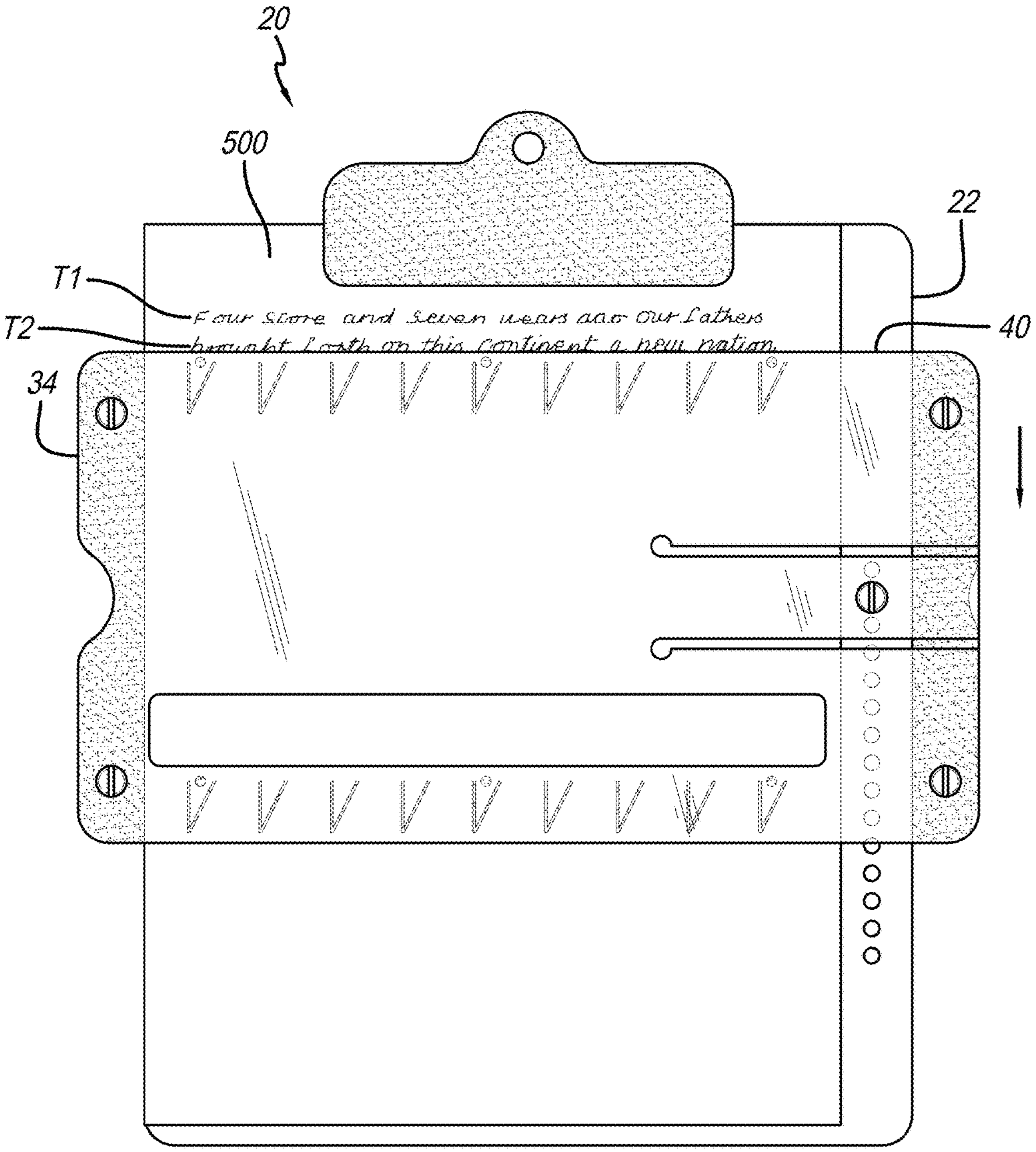
FIG. 9 is a top plan view of the handwriting tool with a second line of text written on the sheet of paper.
Figure 10:
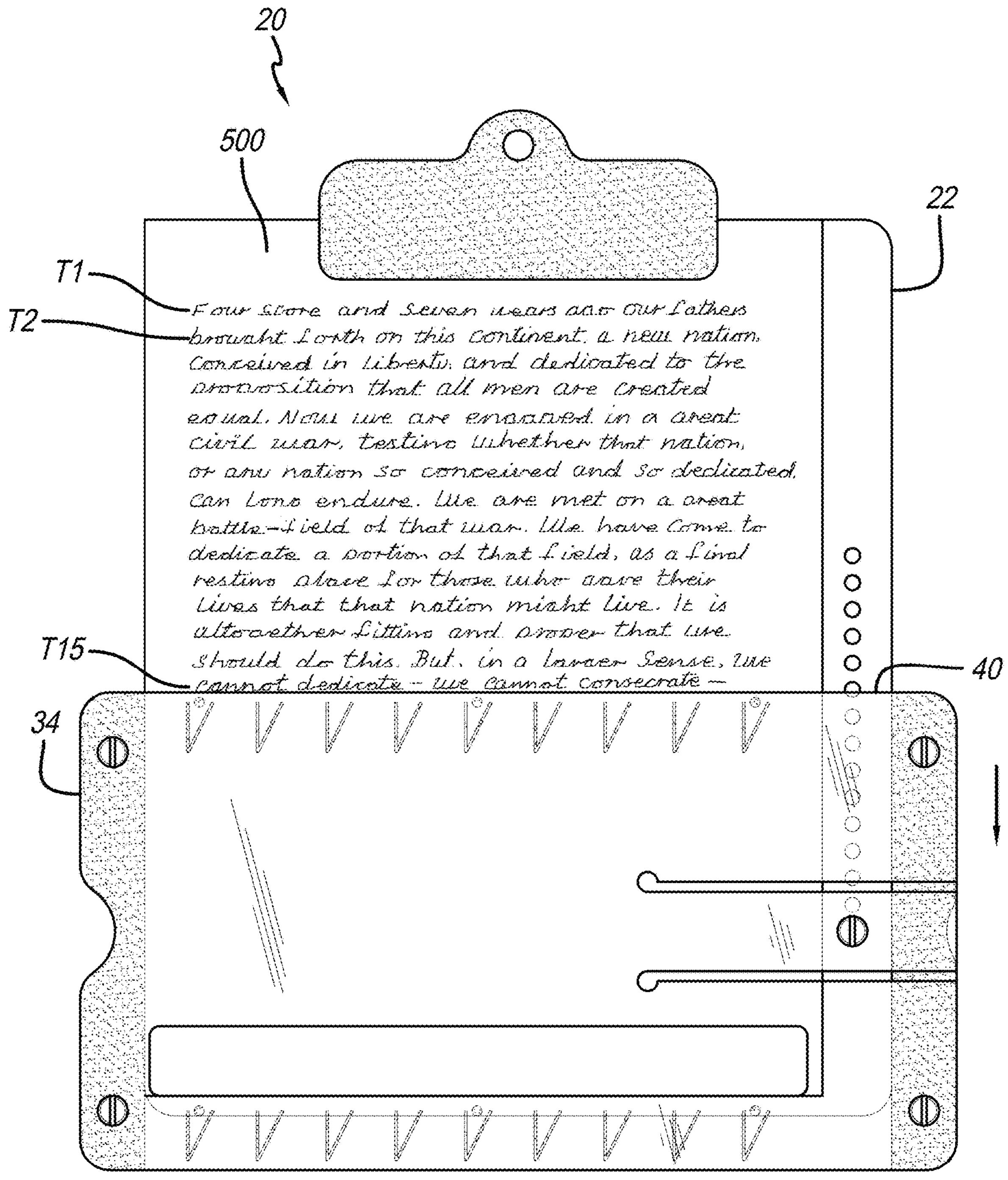
FIG. 10 is a top plan view of the handwriting tool with additional lines of text written on the sheet of paper using the transverse upper writing edge as a guide.

Now referring to FIGS. 8-13 there is illustrated the sequential steps in using handwriting tool 20. FIG. 8 is a top plan view of handwriting tool 20 with a first line of text T1 written on the sheet of paper 500 using transverse first writing edge 40 as a guide. Writing guide 34 has been positioned at the uppermost line station 32 (closest to clip 44, refer to FIG. 2). First writing edge 40 defines the lower boundary of each character of text. In FIG. 9 writing guide 34 has been moved down a second line of text T2 has been written on sheet of paper 500. FIG. 10 is view of handwriting tool 20 with additional lines of text (through line 15) written on sheet of paper 500 using the transverse upper writing edge 40 as a guide. After writing each line of text writing guide 34 has been moved down one line station 32 and another line of text written. In all 15 lines of text have been written. It is further noted that the writer can skip a line of text by simply not writing on a line.

Figure 11:
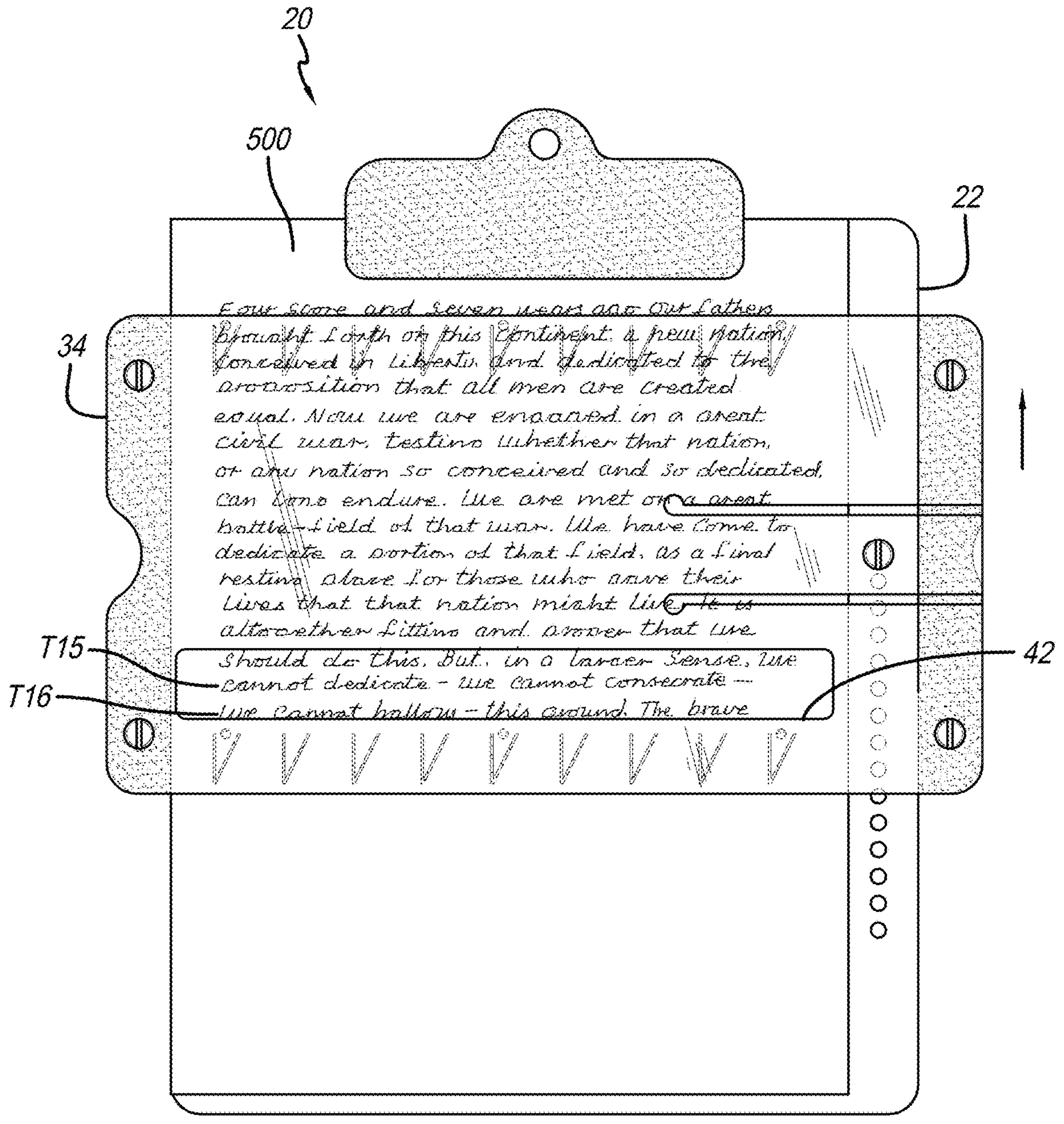
FIG. 11 is a top plan view of the handwriting tool with a writing guide moved back to its position of FIG. 7, and a line of text written on the sheet of paper using a transverse lower writing edge as a guide.
Figure 12:
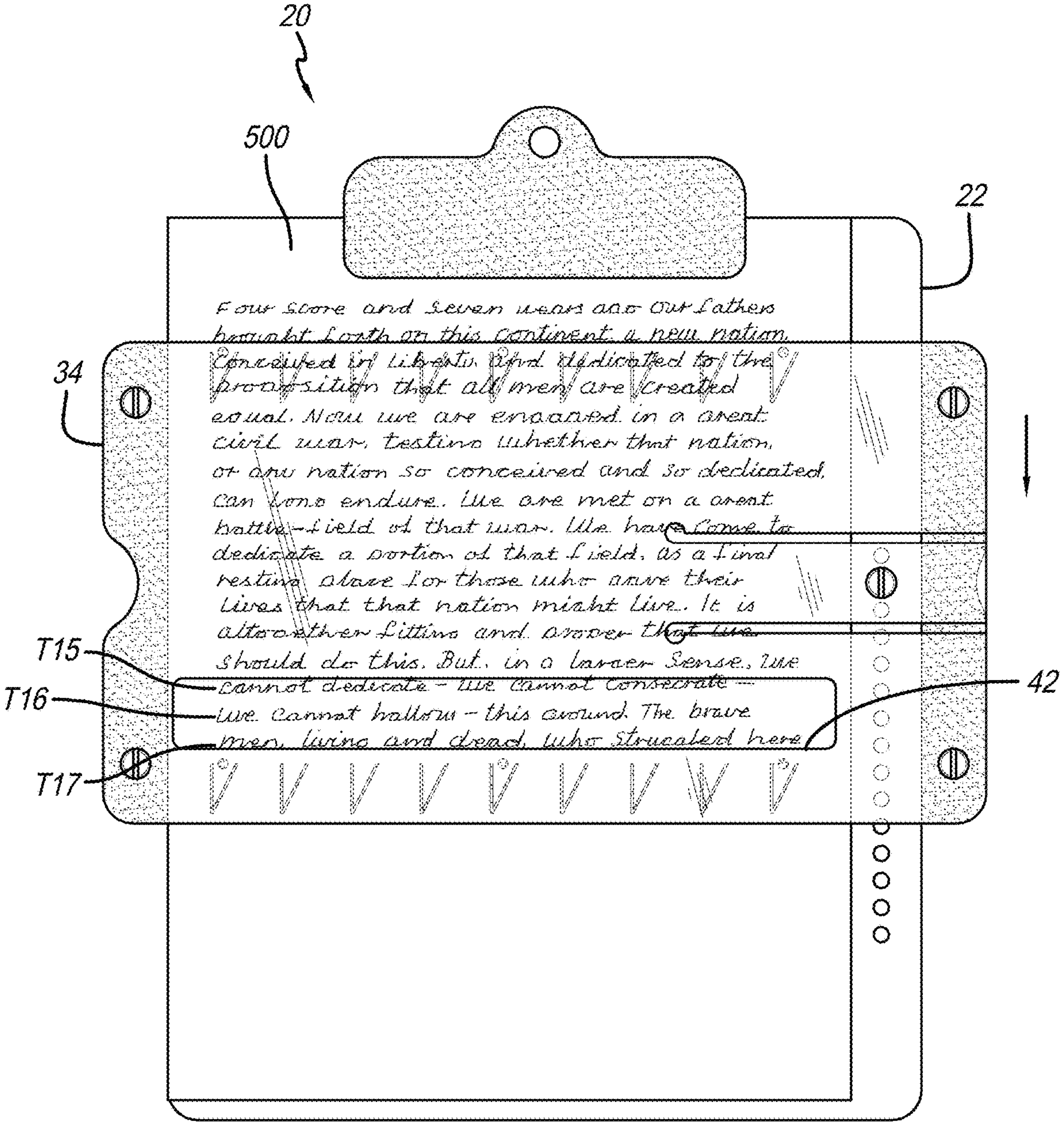
FIG. 12 is a top plan view of the handwriting tool with a second line of text written on the sheet of paper using the lower writing edge as guide.
Figure 13:
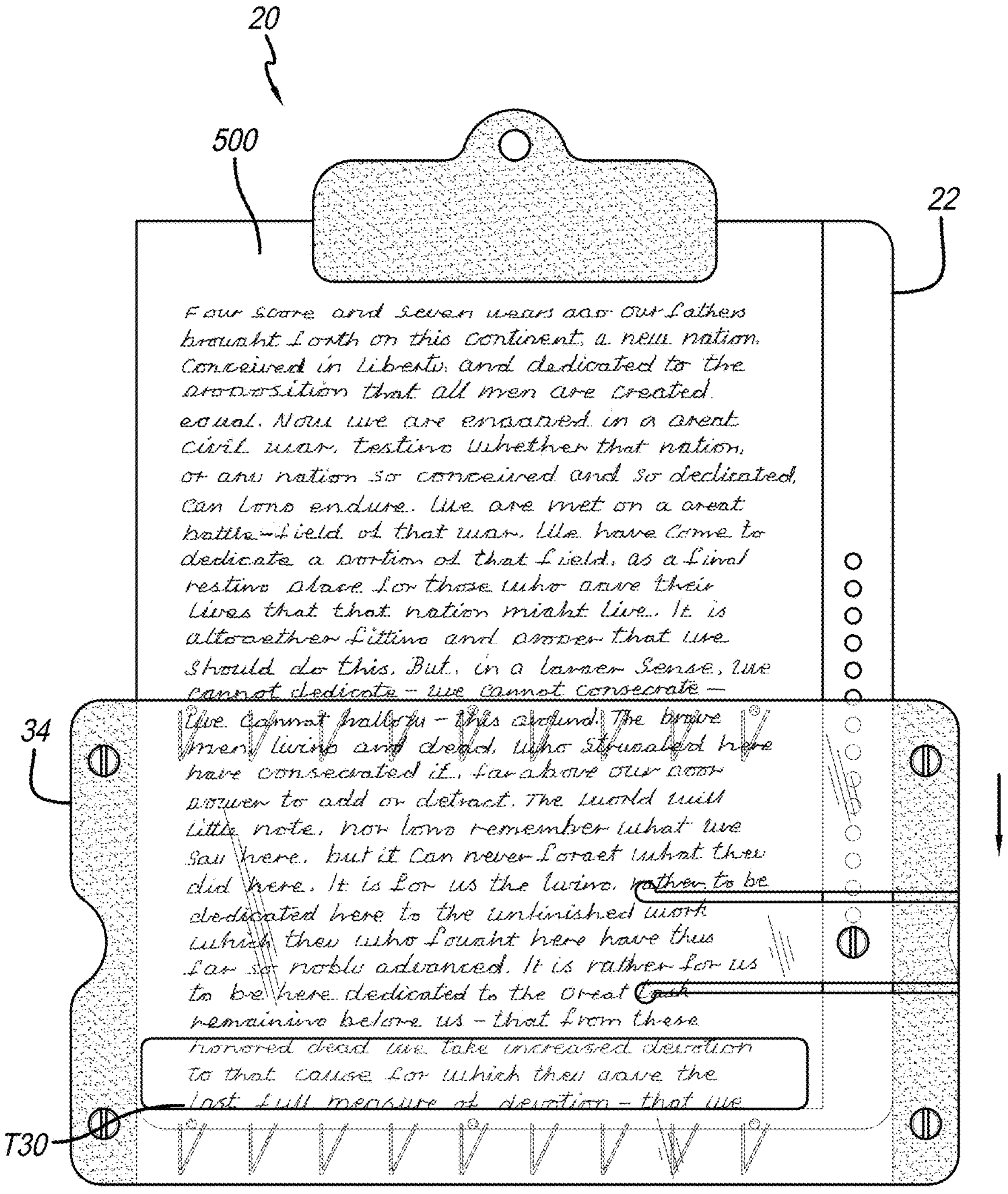
FIG. 13 is a top plan view of the handwriting tool with additional lines of text written of the sheet of paper using the transverse lower writing edge as a guide.

In FIG. 11 writing guide 34 has been moved back to its position of FIG. 8, and a line of text T16 has been written on sheet of paper 500 using transverse lower writing edge 42 as a guide. It is noted that handwriting tool 20 is designed so that the first line of text written using lower writing edge 42 as a guide will be exactly one line space below the last line of text written using upper writing edge 40 as a guide. It is also noted that since writing guide 32 is made from a transparent material, the writer can see the lines of text previously written using upper writing edge 40. In FIG. 12 writing guide 34 has been moved down one line station and another line of text T17 written using lower writing edge 42 as a guide. This process continues until in FIG. 13 writing guide 34 has been incrementally moved down and a line of text T30 written using lower writing edge 42 as a guide.

Figure 14:
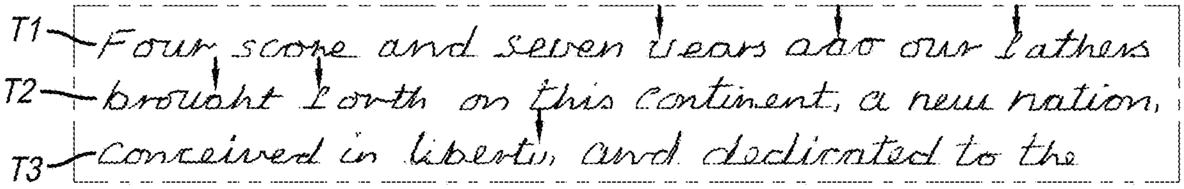
FIG. 14 is an enlarged top plan view showing lines of text without downstrokes.
Figure 15:
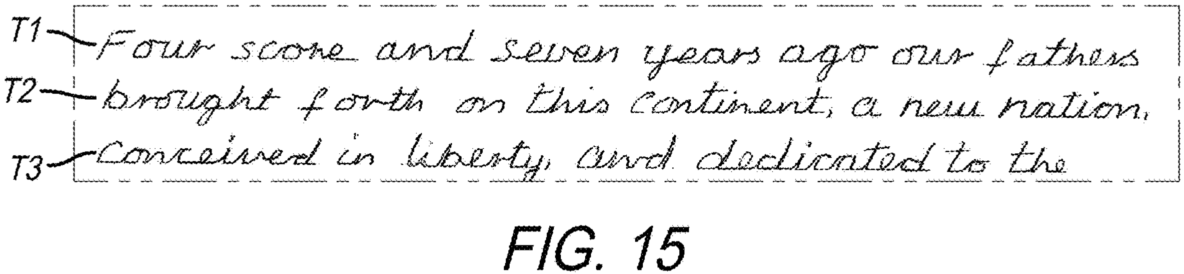
FIG. 15 is an enlarged top plan view showing downstrokes manually added.

FIG. 14 is an enlarged view showing lines of text without downstrokes. The upper 40 and lower 42 writing edges prevent the writer from completing letters which contain downstrokes (parts of the letter which extends below the line of writing. Typically in cursive writing the letters f, g, j, p, q, y have downstrokes, whereas in lower case printing letters g, j, p, q, and y have downstrokes. As such, after using writing tool 20 the writer must go back and manually fill in the missing downstrokes. In the figure the missing downstrokes are indicated by arrows. FIG. 15 is an enlarged view showing the missing downstrokes manually added.

Figure 16:
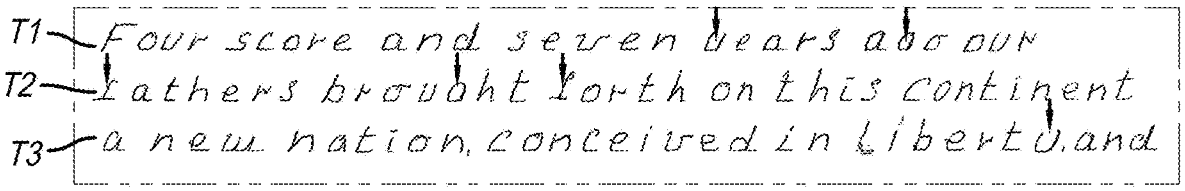
FIG. 16 is an enlarged top plan view showing lines of printed text without downstrokes; and, FIG. 17 is an enlarged top plan view showing downstrokes manually added.
Figure 17:
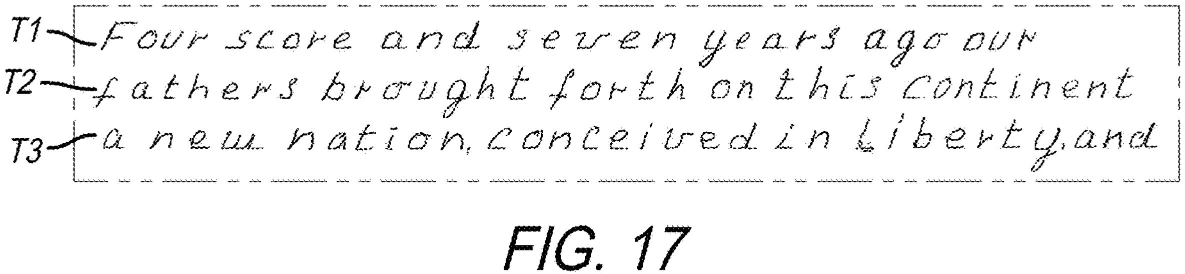

FIG. 16 is an enlarged top plan view showing lines of printed text without downstrokes, and FIG. 17 is an enlarged top plan view showing downstrokes manually added. It is noted that if the writer prints using all capitals there are no downstrokes to be added.

In terms of use, a method for writing includes (refer to FIGS. 1-17)

(a) providing a handwriting tool 20 including;

a paper holder 22 having a writing surface 24, a longitudinal axis 26, an upper section 28, a lower section 30 and a plurality of spaced-apart line stations 32 disposed parallel to the longitudinal axis 26, the plurality of spaced-apart line stations 32 including an uppermost first line station, a second line station disposed below the first line station, and a lowermost line station;

a writing guide 34 is connected to the paper holder 22, the writing guide 34 is slidably positionable along the longitudinal axis 26;

the writing guide 34 having a stop 36 which is engagable with each line station 32 of the plurality of spaced-apart line stations; and, the writing guide 34 including a transverse upper writing edge 40 which is positionable in the upper section 28 of the paper holder 22, and a transverse lower writing edge 42 which is positionable in the lower section 30 of the paper holder 22.

(b) providing a sheet of paper 500;

(c) positioning the sheet of paper 500 on the writing surface 24 of the paper holder 22;

(d) vertically positioning the writing guide 34 so that the stop 36 engages the first line station 32;

(e) writing a first line of text using the upper writing edge 40 as a guide;

(f) after (e) vertically positioning the writing guide 34 so that the stop 36 engages the second line station 32; and, (g) writing a second line of text using the upper writing edge 40 as a guide.

The method further including:

after (g) continuing to incrementally position the writing guide 34 to lower line stations 32 and writing a line of text for each line station including the lowermost line station;

repositioning the writing guide 34 so that the stop 36 again engages the first line station 32;

writing a line of text using the lower writing edge 42 as a guide;

vertically positioning the writing guide so that the stop engages the second line station; and, writing another line of text using the lower writing edge 42 as a guide.

The method further including:

continuing to incrementally position the writing guide 34 to lower line stations 32 and using the lower writing edge 42 to write text for each line station including the lowermost line station.

The method further including:

in (a) a total number of the spaced-apart line stations 32 being n; and, a number of lines of text provided by the tool being equal to 2n.

The method further including:

in (e) the first line of text including a letter which requires a downstroke; and, after (e) manually adding the downstroke to the letter.

The method further including;

in (a) the writing guide 34 being a sleeve which surrounds the paper holder 22.

The method further including:

in (a) the plurality of spaced-apart line stations 32 being evenly spaced holes; and, the stop 36 being a pin which can engage each of the holes.

1 The method further including:

in (a) a window 46 disposed in the writing guide 34, the lower writing edge 42 being a lower edge of the window 46.

The method further including:

in (a) a plurality of upper guide lines 50 disposed adjacent the upper writing edge 40; and, a plurality of lower guide lines 50 disposed adjacent the lower writing edge 42.

The embodiments of the handwriting tool and method of use described herein are exemplary and numerous modifications, combinations, variations, and rearrangements can be readily envisioned to achieve an equivalent result, all of which are intended to be embraced within the scope of the appended claims. Further, nothing in the above-provided discussions of the handwriting tool and method should be construed as limiting the invention to a particular embodiment or combination of embodiments. The scope of the invention is defined by the appended claims.

I claim:

1. A handwriting tool comprising:

a paper holder having a writing surface, a longitudinal axis, an upper section, a lower section, and a plurality of spaced-apart line stations disposed parallel to said longitudinal axis;

a writing guide connected to said paper holder, said writing guide slidably positionable along said longitudinal axis;

said writing guide having a stop which is engagable with each line station of said plurality of spaced-apart line stations;

said writing guide including a transverse upper writing edge which is positionable in said upper section of said paper holder, and a transverse lower writing edge which is positionable in said lower section of said paper holder; and, said writing guide being a sleeve which surrounds said paper holder.

2. The handwriting tool of claim 1 further including:

said writing guide positionable to a plurality of detent positions along said longitudinal axis of said paper holder, wherein each said detent position corresponds to a line of text at said upper writing edge and a line of text at said lower writing edge.

3. The handwriting tool of claim 1 further including:

said plurality of spaced-apart line stations being evenly spaced holes; and, said stop being a pin which is engageable with each of said holes.

4. The handwriting tool of claim 1 further including:

a window disposed in said writing guide, said lower writing edge forming a lower edge of said window.

5. The handwriting tool of claim 1, the handwriting tool cooperating with a sheet of paper, the handwriting tool further including:

said paper holder including a magnetic clip which holds the sheet of paper in place.

6. A handwriting tool comprising:

a paper holder having a writing surface, a longitudinal axis, an upper section, a lower section, and a plurality of spaced-apart line stations disposed parallel to said longitudinal axis;

a writing guide connected to said paper holder, said writing guide slidably positionable along said longitudinal axis;

said writing guide having a stop which is engagable with each line station of said plurality of spaced-apart line stations;

said writing guide including a transverse upper writing edge which is positionable in said upper section of said paper holder, and a transverse lower writing edge which is positionable in said lower section of said paper holder;

a plurality of upper guide lines disposed adjacent said upper writing edge; and, a plurality of lower guide lines disposed adjacent said lower writing edge.

7. A handwriting tool comprising:

a paper holder having a writing surface, a longitudinal axis, an upper section, a lower section, and a plurality of spaced-apart line stations disposed parallel to said longitudinal axis;

a writing guide connected to said paper holder, said writing guide slidably positionable along said longitudinal axis;

said writing guide having a stop which is engagable with each line station of said plurality of spaced-apart line stations;

said writing guide including a transverse upper writing edge which is positionable in said upper section of said paper holder, and a transverse lower writing edge which is positionable in said lower section of said paper holder;

a total number of said spaced-apart line stations being n; and, a number of lines of text provided by said handwriting tool being equal to 2n.

8. A handwriting tool which cooperates with a sheet of paper, the handwriting tool comprising:

a paper holder having a writing surface, a longitudinal axis, an upper section, a lower section, and a plurality of spaced-apart line stations disposed parallel to said longitudinal axis;

a writing guide connected to said paper holder, said writing guide slidably positionable along said longitudinal axis;

said writing guide having a stop which is engagable with each line station of said plurality of spaced-apart line stations;

said writing guide including a transverse upper writing edge which is positionable in said upper section of said paper holder, and a transverse lower writing edge which is positionable in said lower section of said paper holder;

said writing guide positionable to a plurality of detent positions along said longitudinal axis of said paper holder, wherein each said detent position corresponds to a line of text at said upper writing edge and a line of text at said lower writing edge;

said plurality of spaced-apart line stations being evenly spaced holes;

said stop being a pin which is engageable with each of said holes;

a window disposed in said writing guide, said lower writing edge forming a lower edge of said window;

a plurality of upper guide lines disposed adjacent said upper writing edge;

a plurality of lower guide lines disposed adjacent said lower writing edge;

said paper holder including a magnetic clip which holds the sheet of paper in place;

a total number of said spaced-apart line stations being n; and, a number of lines of text provided by said tool being equal to 2n.

9. A method for writing comprising:

(a) providing a handwriting tool including;

a paper holder having a writing surface, a longitudinal axis, an upper section, a lower section and a plurality of spaced-apart line stations disposed parallel to said longitudinal axis, said plurality of spaced-apart line stations including an uppermost first line station, a second line station disposed below said first line station, and a lowermost line station;

a writing guide connected to said paper holder, said writing guide slidably positionable along said longitudinal axis;

said writing guide having a stop which is engagable with each line station of said plurality of spaced-apart line stations;

said writing guide including a transverse upper writing edge which is positionable in said upper section of said paper holder, and a transverse lower writing edge which is positionable in said lower section of said paper holder;

a total number of said spaced-apart line stations being n; and, a number of lines of text provided by said tool being equal to 2n;

(b) providing a sheet of paper;

(c) positioning said sheet of paper on said writing surface of said paper holder;

(d) vertically positioning said writing guide so that said stop engages said first line station;

(e) writing a first line of text using said upper writing edge as a guide;

(f) after (e) vertically positioning said writing guide so that said stop engages said second line station; and, (g) writing a second line of text using said upper writing edge as a guide.

10. The method of claim 9 further including:

after (g) continuing to incrementally position said writing guide to lower said line stations and writing a line of text for each said line station including said lowermost line station;

repositioning said writing guide so that said stop again engages said first line station;

writing a line of text using said lower writing edge as a guide;

vertically positioning said writing guide so that said stop engages said second line station; and, writing another line of text using said lower writing edge as a guide.

11. The method of claim 10 further including:

continuing to incrementally position said writing guide to lower said line stations and using said lower writing edge to write text for each said line station including said lowermost line station.

12. The method of claim 9 further including:

in (e) said first line of text including a letter which requires a downstroke; and, after (e) manually adding said downstroke to said letter.

13. The method of claim 9 further including:

in (a) said plurality of spaced-apart line stations being evenly spaced holes; and, said stop being a pin which is engageable with each of said holes.

14. The method of claim 9 further including:

in (a) a window disposed in said writing guide, said lower writing edge being a lower edge of said window.

15. A method for writing comprising:

(a) providing a handwriting tool including;

a paper holder having a writing surface, a longitudinal axis, an upper section, a lower section and a plurality of spaced-apart line stations disposed parallel to said longitudinal axis, said plurality of spaced-apart line stations including an uppermost first line station, a second line station disposed below said first line station, and a lowermost line station;

a writing guide connected to said paper holder, said writing guide slidably positionable along said longitudinal axis;

said writing guide having a stop which is engagable with each line station of said plurality of spaced-apart line stations;

said writing guide including a transverse upper writing edge which is positionable in said upper section of said paper holder, and a transverse lower writing edge which is positionable in said lower section of said paper holder;

said writing guide being a sleeve which surrounds said paper holder;

(b) providing a sheet of paper;

(c) positioning said sheet of paper on said writing surface of said paper holder;

(d) vertically positioning said writing guide so that said stop engages said first line station;

(e) writing a first line of text using said upper writing edge as a guide;

(f) after (e) vertically positioning said writing guide so that said stop engages said second line station; and, (g) writing a second line of text using said upper writing edge as a guide.

16. A method for writing comprising:

(a) providing a handwriting tool including;

a paper holder having a writing surface, a longitudinal axis, an upper-section, a lower section and a plurality of spaced-apart line stations disposed parallel to said longitudinal axis, said plurality of spaced-apart line stations including an uppermost first line station, a second line station disposed below said first line station, and a lowermost line station;

a writing guide connected to said paper holder, said writing guide slidably positionable along said longitudinal axis;

said writing guide having a stop which is engagable with each line station of said plurality of spaced-apart line stations;

said writing guide including a transverse upper writing edge which is positionable in said upper section of said paper holder, and a transverse lower writing edge which is positionable in said lower section of said paper holder;

a plurality of upper guide lines disposed adjacent said upper writing edge; and, a plurality of lower guide lines disposed adjacent said lower writing edge;

(b) providing a sheet of paper;

(c) positioning said sheet of paper on said writing surface of said paper holder;

(d) vertically positioning said writing guide so that said stop engages said first line station;

(e) writing a first line of text using said upper writing edge as a guide;

(f) after (e) vertically positioning said writing guide so that said stop engages said second line station; and, (g) writing a second line of text using said upper writing edge as a guide.

* * * * *